United States Patent
Yoshitani

(10) Patent No.: US 9,921,597 B2
(45) Date of Patent: Mar. 20, 2018

(54) POWER CONTROL APPARATUS, POWER CONTROL SYSTEM, AND CONTROL METHOD

(71) Applicant: KYOCERA CORPORATION, Kyoto (JP)

(72) Inventor: Naohisa Yoshitani, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 796 days.

(21) Appl. No.: 14/363,478

(22) PCT Filed: Dec. 10, 2012

(86) PCT No.: PCT/JP2012/081957
§ 371 (c)(1),
(2) Date: Jun. 6, 2014

(87) PCT Pub. No.: WO2013/085058
PCT Pub. Date: Jun. 13, 2013

(65) Prior Publication Data
US 2015/0057819 A1    Feb. 26, 2015

(30) Foreign Application Priority Data

Dec. 9, 2011  (JP) ................. 2011-270579

(51) Int. Cl.
*G05F 1/66* (2006.01)
*H04L 1/18* (2006.01)
(Continued)

(52) U.S. Cl.
CPC ............... *G05F 1/66* (2013.01); *H04L 1/188* (2013.01); *H04L 12/2803* (2013.01);
(Continued)

(58) Field of Classification Search
CPC ....... G05F 1/66; H04L 1/188; H04L 12/2803; H04L 2001/0097; H04W 52/0216; H04W 52/0219; H04W 84/18
See application file for complete search history.

(56) References Cited

U.S. PATENT DOCUMENTS 5,815,667 A * 9/1998 Chien .................... H04L 47/10
370/229
6,246,693 B1 * 6/2001 Davidson .................. H04L 1/08
370/445
(Continued)

FOREIGN PATENT DOCUMENTS

JP    2000-261496 A    9/2000
JP    2004-015556 A    1/2004
(Continued)

OTHER PUBLICATIONS

The extended European search report issued by the European Patent Office dated Mar. 19, 2015, which corresponds to European Patent Application No. 12856222.0-1851 and is related to U.S. Appl. No. 14/363,478.
(Continued)

*Primary Examiner* — Kenneth M Lo
*Assistant Examiner* — Michael J. Huntley
(74) *Attorney, Agent, or Firm* — Procopio Cory Hargreaves and Savitch LLP

(57) ABSTRACT

A HEMS 200 connects to equipment provided in a consumer through a communication network and controls the equipment. The HEMS 200 comprises a transceiver unit 210 transmitting control information for controlling the equipment to the equipment in each control cycle T and a control unit 240 controlling a transmission of the control information; the control unit 240 controls the transceiver unit 210 to retransmit the control information to the equipment when response information corresponding to the control informa-
(Continued)

tion is not received within a timeout period t set to be shorter than the control cycle T from the transmission of the control information from the transceiver unit 210. The control unit 240 changes the timeout period t by controlling a retransmission possible frequency of the control information within the period of the control cycle T.

3 Claims, 5 Drawing Sheets

(51) Int. Cl.
*H04L 12/28* (2006.01)
*H04W 52/02* (2009.01)
*H04L 1/00* (2006.01)
*H04W 84/18* (2009.01)

(52) U.S. Cl.
CPC . *H04L 2001/0097* (2013.01); *H04W 52/0216* (2013.01); *H04W 52/0219* (2013.01); *H04W 84/18* (2013.01); *Y02B 60/50* (2013.01)

(56) References Cited

U.S. PATENT DOCUMENTS

| | | | | |
|---|---|---|---|---|
| 6,587,453 | B1* | 7/2003 | Romans | H04L 12/6418 370/347 |
| 7,032,153 | B1* | 4/2006 | Zhang | H04L 1/0018 714/749 |
| 7,188,293 | B2* | 3/2007 | Park | H04L 1/0015 714/748 |
| 7,240,087 | B1* | 7/2007 | Walker | H04L 1/188 709/200 |
| 7,388,852 | B2* | 6/2008 | Zhang | H04L 1/0001 370/274 |
| 7,636,038 | B1* | 12/2009 | Nof | H04W 24/04 340/506 |
| 8,234,548 | B2* | 7/2012 | Kure | H04L 1/0009 714/758 |
| 8,325,650 | B2* | 12/2012 | Hu | H04L 1/1845 370/328 |
| 2002/0191573 | A1* | 12/2002 | Whitehill | H04L 1/0002 370/338 |
| 2004/0165543 | A1* | 8/2004 | Nakazawa | H04L 47/10 370/252 |
| 2005/0030921 | A1* | 2/2005 | Yau | H04L 45/00 370/329 |
| 2005/0190720 | A1 | 9/2005 | Miyake et al. | |
| 2007/0049252 | A1* | 3/2007 | Smith | H04L 1/188 455/411 |
| 2007/0124642 | A1* | 5/2007 | Suh | H04L 1/1867 714/749 |
| 2008/0031138 | A1* | 2/2008 | Okamasu | H04L 1/1685 370/236 |
| 2008/0089315 | A1* | 4/2008 | Westphal | H04L 45/00 370/351 |
| 2008/0107034 | A1* | 5/2008 | Jetcheva | H04L 45/122 370/238 |
| 2008/0279140 | A1* | 11/2008 | Gaur | H04W 72/02 370/329 |
| 2008/0320354 | A1* | 12/2008 | Doppler | H04L 1/04 714/748 |
| 2010/0150122 | A1* | 6/2010 | Berger | H04W 4/02 370/338 |
| 2011/0035510 | A1* | 2/2011 | Alexander | G01D 4/002 709/246 |
| 2012/0140695 | A1* | 6/2012 | Hunzinger | H04L 1/1812 370/315 |
| 2012/0147802 | A1* | 6/2012 | Ukita | H04W 52/0277 370/311 |
| 2013/0003751 | A1* | 1/2013 | Huse | H04L 47/27 370/412 |
| 2013/0181848 | A1* | 7/2013 | Picard | G01D 4/004 340/870.03 |
| 2014/0376405 | A1* | 12/2014 | Erickson | H04W 52/0212 370/254 |

FOREIGN PATENT DOCUMENTS

| | | |
|---|---|---|
| JP | 2005-236961 A | 9/2005 |
| JP | 2008-42311 A | 2/2008 |
| JP | 2011-166482 A | 8/2011 |
| WO | 2008/148960 A1 | 12/2008 |
| WO | WO 2008148960 A1 * | 12/2008 ............ H04L 47/10 |

OTHER PUBLICATIONS

Communication pursuant to Rules 70(2) and 70a(2) EPC issued by the European Patent Office dated Apr. 9, 2015, which corresponds to European Patent Application No. 12856222.0-1851 and is related to U.S. Appl. No. 14/363,478.

International Search Report; PCT/JP2012/081957; dated Feb. 19, 2013.

\* cited by examiner

| EQUIPMENT ID | ID101 | ID102 | ID103 | ID104 |
|---|---|---|---|---|
| EQUIPMENT TYPE ID | AIR CONDITIONER | AIR CONDITIONER | TEMPERATURE SENSOR | TEMPERATURE SENSOR |
| NUMBER h OF HOPS | h1 = 1 | h2 = 2 | h3 = 1 | h4 = 2 |
| CONTROL CYCLE T | T1 | T2 | T3 | T4 |
| TIMEOUT PERIOD t | t1 | t2 | t3 | t4 |
| RETRANSMISSION POSSIBLE FREQUENCY r | r1 | r2 | r3 | r4 |

POWER CONTROL APPARATUS, POWER CONTROL SYSTEM, AND CONTROL METHOD

TECHNICAL FIELD

The present invention relates to a power control apparatus connecting to equipment provided in a consumer through a radio communication and controlling the equipment, and a control method.

BACKGROUND ART

It is known a power control apparatus that controls equipment such as a load provided in a consumer and a distributed power supply, and performs an optimum energy management. Among such power control apparatuses, which intended for a house is called an HEMS (Home Energy Management System).

The power control apparatus described above transmits control information, which is for performing controls such as equipment state confirmation and equipment setting change, to equipment in a predetermined cycle (hereinafter, "predetermined cycle"). The equipment receiving the control information transmits response information corresponding to the control information to the power control apparatus.

Here, in a power control apparatus, when transmitting control information to equipment in a predetermined cycle, an application operating in a higher layer is configured to perform a retransmission control (a retransmission control of an application layer) using a timeout period and a retransmission possible frequency, separately from a retransmission control (a retransmission control of a physical layer) by a communication protocol of a lower layer. In a power control apparatus, since a control of equipment is managed by an application, such retransmission control by an application is necessary.

However, in a radio communication according to an ad hoc network in which a communication path changes dynamically, it is difficult for a power control apparatus to estimate a timeout period used for a retransmission control corresponding to the control target equipment.

Here, it is disclosed a technique for changing a timeout period based on a change of number (number of hops) of relay apparatuses through which control information is relayed from a power control apparatus to control target equipment (for example, referring to Patent Literature 1).

CITATION LIST

Patent Literature

Patent Literature 1: Japanese Patent Application Publication No. 2004-15556

SUMMARY OF INVENTION

However, in a power control apparatus performing a transmission of control information in a predetermined cycle, a timeout period is set to be too long sometimes when changing the timeout period merely based on a change of number of hops. In this case, when the power control apparatus retransmits the control information according to the retransmission control, there is a risk that congestion occurs between the retransmitted control information and control information that is to be transmitted in the next control cycle.

Therefore, the present invention is for solving the problem described above and is to provide a power control apparatus, a power control system and a control method, which can suppress congestion of control information even when the control information for performing a control of equipment is transmitted in a predetermined cycle.

A power control apparatus (an HEMS 200) according to a first feature connects to equipment provided in a consumer through a communication network and controls the equipment. The power control apparatus comprises a transmission unit that transmits control information for controlling the equipment to the equipment in a predetermined cycle, and a control unit that controls a transmission of the control information. The control unit controls the transmission unit to retransmit the control information to the equipment when a response period from a transmission of the control information, which is from the transmission unit to the equipment, to a reception of response information corresponding to the control information is longer than a timeout period which is set to be shorter than the predetermined cycle. The control unit is configured to change the timeout period by controlling a retransmission possible frequency of the control information within the period of the predetermined cycle from the transmission of the control information from the transmission unit to the equipment.

In the first feature, a product of the timeout period and the retransmission possible frequency of the control information is configured to be smaller than the predetermined cycle.

In the first feature, the timeout period is configured to be a period obtained by dividing the predetermined cycle by a number obtained by adding one to the retransmission possible frequency of the control information.

In the first feature, the control unit is configured to extend the timeout period by reducing the retransmission possible frequency of the control information when the response period is longer than the timeout period.

In the first feature, the control unit is configured to shorten the timeout period by increasing the retransmission possible frequency of the control information, when the response period is shorter than the timeout period and the response period is shorter than a period obtained by dividing the predetermined cycle by a number obtained by increasing the retransmission possible frequency of the control information by two.

In the first feature, the communication network is configured to be an ad hoc network, and the control unit is configured to set, as a timeout period of the equipment, a timeout period that is set for other equipment whose number of hops and equipment type are the same as the equipment, when changing the timeout period.

In the first feature, the control unit is configured to make the transmission unit transmit the control information by a communication method compliant with ZigBee standard.

A power control system according to a second feature comprises equipment provided in a consumer and a power control apparatus controlling the equipment through a communication network. The power control apparatus comprises a transmission unit that transmits control information for controlling the equipment to the equipment in a predetermined cycle, and a control unit that controls a transmission of the control information. The control unit controls the transmission unit to retransmit the control information to the equipment when a response period from a transmission of the control information, which is from the transmission unit to the equipment, to a reception of response information corresponding to the control information is longer than a timeout period that is set to be shorter than the predetermined cycle. The control unit is configured to change the timeout period by controlling the retransmission possible frequency of the control information within the period of the predetermined cycle of the control information from the transmission unit to the equipment.

A control method according to a third feature is a control method in a power control apparatus that connects to equipment provided in a consumer through a communication network and controls the equipment. The control method is configured to comprise a step A of transmitting control information for controlling the equipment to the equipment in each predetermined cycle, a step B of retransmitting the control information to the equipment when a response period from a transmission of the control information, which is to the equipment, to a reception of response information corresponding to the control information is longer than a timeout period that is set to be shorter than the predetermined cycle, and a step C of changing the timeout period by changing a retransmission possible frequency of the control information within the period of the predetermined cycle from the transmission of the control information to the equipment.

According to the present invention, it is possible to provide a power control apparatus and a control method which can suppress congestion of control information even when control information for performing a control of equipment is transmitted periodically.

DESCRIPTION OF THE EMBODIMENT

Hereinafter, an embodiment of the present invention will be described with reference to the accompanying drawings. In the descriptions of the drawings below, the same or similar reference signs are assigned to the same or similar portions. However, it must be understood that the drawings are schematic, and the ratio of each dimension and the like are different from the real ones. Accordingly, specific dimensions and the like should be determined by taking the following descriptions into consideration. Further, among the drawings, portions in which the relationships or the ratios of the dimensions are different from each other are included.

[First Embodiment]

Figure 1:
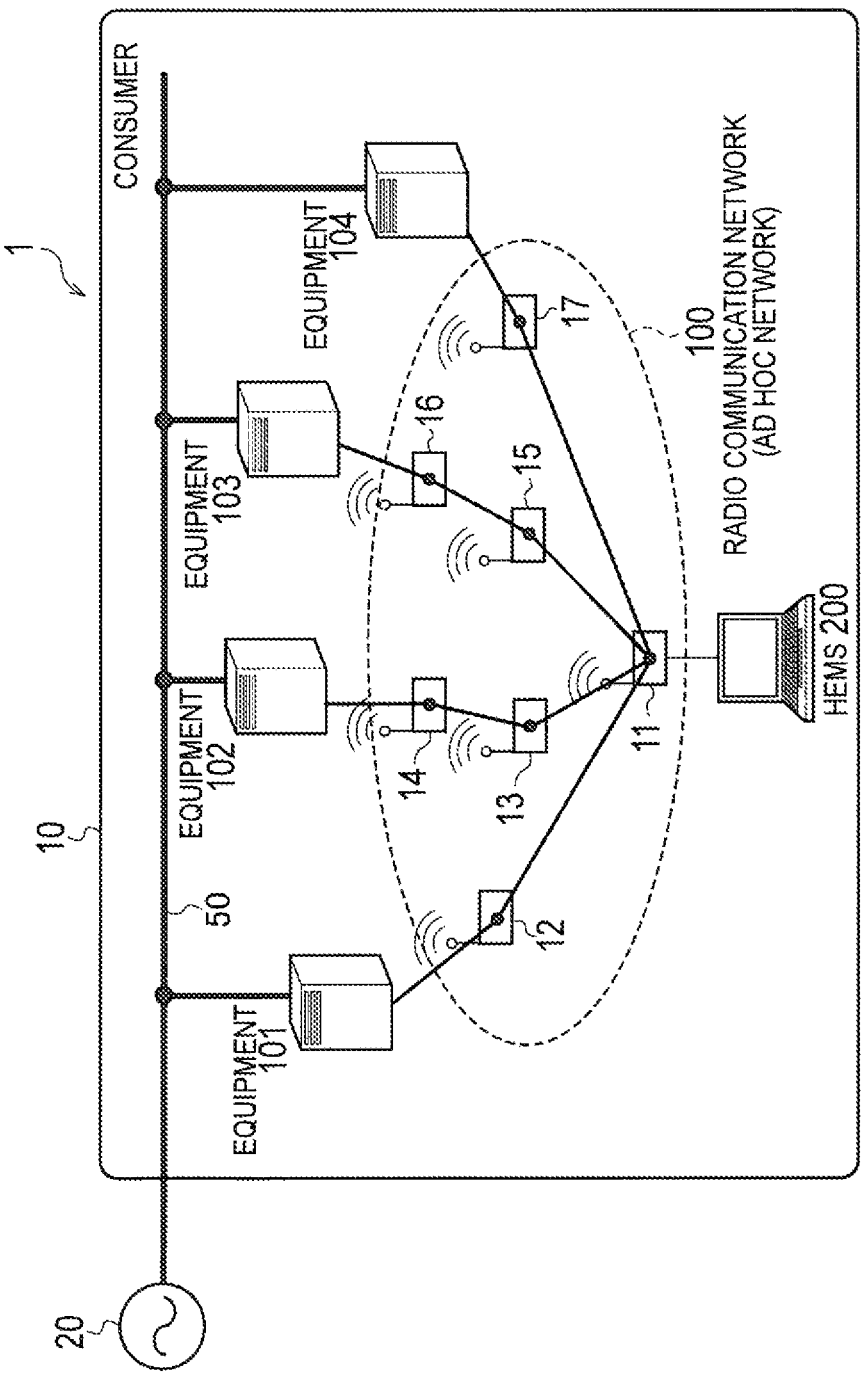
FIG. 1 is a diagram showing a power control system according to a first embodiment.

A power control system according to a first embodiment will be described. FIG. 1 is a diagram showing a power control system 1 according to the first embodiment. As shown in FIG. 1, the power control system 1 is provided in a consumer 10. In the present embodiment, the consumer 10 is assumed to be a house and the like. The power control system 1 performs a power control in the consumer 10 which is connected to a power grid 20. The power control system 1 comprises a plurality of equipment 101 to 104 provided in the consumer 10, and an HEMS 200 connecting to the plurality of equipment 101 to 104 through a radio communication network 100.

The plurality of equipment 101 to 104 perform various processes in accordance with an instruction from the HEMS 200. The plurality of equipment 101 to 104 include loads provided in a consumer, sensors, distributed power supplies, and the like. The plurality of equipment 101 to 104 may include other equipment such as distribution boards.

The load is an apparatus that consuming power provided through a power line 50. For example, the load includes a refrigerator, a lighting device, an air conditioner, a television, and the like. The load may be a singular apparatus and may also be a plurality of apparatuses.

The sensor is, for example, a temperature sensor for measuring temperature, or a sensor for measuring power consumption consumed in the consumer 10, a sensor for measuring a power provided from a distributed power supply, or a sensor for measuring a power that is a reverse power flow from a distributed power supply to the gird 20.

The distributed power supply is a power supply means for providing power to equipment in the consumer 10. For example, a distributed power supply includes a fuel cell such as an SOFC (Solid Oxide Fuel Cell) or a PEFC (Polymer Electrolyte Fuel Cell), or a power generation apparatus using renewable energy such as solar light, wind power, and geothermal heat, or a storage battery for storing power or discharging. The storage battery may include a battery for electric vehicle.

The HEMS 200 is an apparatus (HEMS: Home Energy Management System) that manages power of the consumer 10, and is an example for a power control apparatus. The HEMS 200 communicates with the equipment 101 to 104 through a radio communication network 100. The radio communication network 100 is configured by a plurality of relay apparatuses 11 to 17 and configures an ad hoc network. The HEMS 200 communicates with the equipment 101 to 104 through the plurality of relay apparatuses 11 to 17. The HEMS 200 communicates with the equipment 101 to 104 preferably by a communication method compliant with Echonet Lite, or a communication method compliant with ZigBee (registered trademark) and IEEE 802.15.4 or the like.

Figures 2, 3:
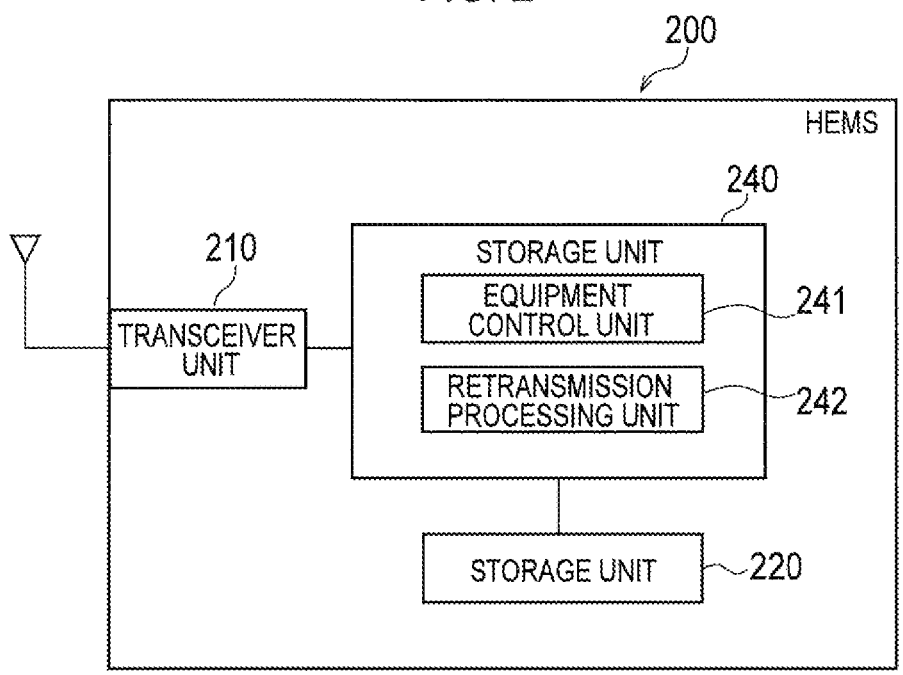
FIG. 2 is a block diagram showing an HEMS according the first embodiment.
FIG. 3 is a diagram showing information stored in a storage unit according to the first embodiment.

The HEMS 200 comprises, as shown in FIG. 2, a transceiver unit 210, a storage unit 220, and a control unit 240.

The transceiver unit 210 communicates with the equipment 101 to 104 through the radio communication network 100. The transceiver unit 210 converts information in a higher layer inputted from the control unit 240 to a format in a lower layer for the equipment 101 to 104 to perform processes, and transmits the converted information to the equipment 101 to 104. As described below, in the present embodiment, when control information for controlling the equipment is inputted from the control unit 240, the transceiver unit 210 transmits the control information to the equipment 101 to 104 in a predetermined cycle.

Further, the transceiver unit 210 converts information received from the plurality of equipment 101 to 104 to a format for the control unit 240 which is a higher layer to perform processes, and outputs the converted information to the control unit 240. Specifically, the transceiver unit 210 outputs it to the control unit 240 when receiving a signal of response information corresponding to the control information from the plurality of equipment 101 to 104. The transceiver unit 210 converts these information to a format complaint with ZigBee (registered trademark) and IEEE 802. 15. 4. In the present embodiment, the transceiver unit 210 configures a communication module compliant with ZigBee (registered trademark) and IEEE 802.15.4.

The storage unit 220 stores a program that the control unit 240 performs and is used as a work area during the performance of the program at the control unit 240. The storage unit 220 associates and stores, as shown in FIG. 3, the equipment ID, equipment type ID, number h of hops, a control cycle T, a timeout period t, and a retransmission possible frequency r described later.

The equipment ID is identification information for identifying the equipment 101 to 104 provided in the consumer 10. The equipment ID is information assigned by the HEMS 200 when the equipment 101 to 104 are registered initially in the power control system 1.

The equipment type ID is, for example, "air conditioner" or "temperature sensor", identification information for identifying types of the equipment 101 to 104 provided in the consumer 10. Besides, the equipment type ID has, such as "storage battery" or "lighting device", various types in accordance with functions of the equipment 101 to 104.

The number h of hops shows a number of one or a plurality of relay apparatuses relayed in a communication between the HEMS 200 and the plurality of equipment 101 to 104. The HEMS 200 can acquire the number h of hops by using a route information acquiring command such as "Traceroute". In the present embodiment, information showing the number h of hops is, as described below, included in response information transmitted from the equipment 101 to 104 to the HEMS 200.

The control cycle T is, as described below, an example for a predetermined cycle in which the control unit 240 transmits control information to the equipment 101 to 104. The control information is information for controlling each of the plurality of equipment 101 to 104. The control cycle T is set to be different from each other in accordance with a timing which is to control the equipment 101 to 104. In the present embodiment, the control cycle T is described under an assumption that the same cycle is set for each of the plurality of equipment 101 to 104.

The timeout period t is, as described below, information used in a retransmission control for retransmitting the control information to the equipment 101 to 104. The timeout period t may be set to be different from each other for each of the equipment 101 to 104, and may also be set to be the same for each of the plurality of equipment 101 to 104. The timeout period t is set by the control unit 240 (a retransmission processing unit 242).

The retransmission possible frequency r is also information used in a retransmission control for retransmitting the control information to the equipment 101. In the present embodiment, the retransmission possible frequency r shows a frequency that a retransmission of the control information is possible within the control cycle T. The control unit 240 determines that an error occurs, when a frequency for retransmitting the control information is larger than the retransmission possible frequency r while performing a retransmission control. However, for the retransmission possible frequency r, an upper limit value and a lower limit value are preferably to be set in advance. An increase of the retransmission possible frequency more than necessary can be suppressed by setting an upper limit value in advance. A minimum retransmission can be performed by setting a lower limit value in advance.

Figure 4:
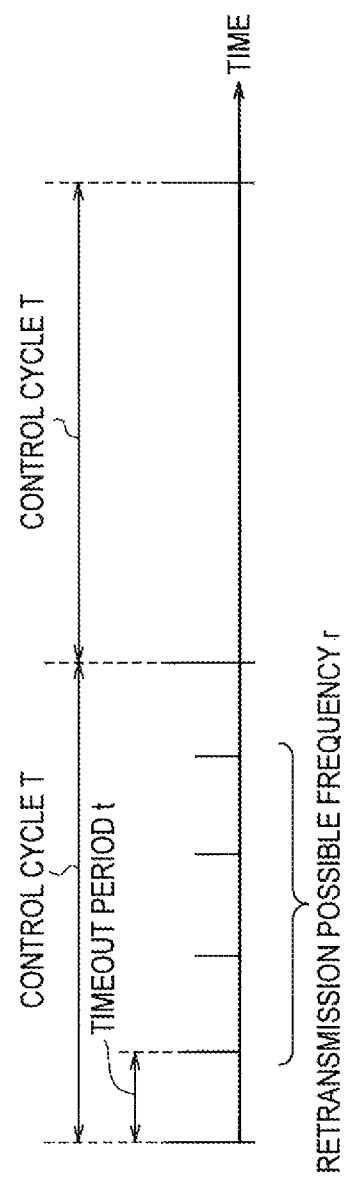
FIG. 4 is a conceptual diagram showing a time series relationship of a control cycle, a timeout period, and a retransmission possible frequency.

Here, in the present embodiment, a relationship of the control cycle T, the timeout period t, and the retransmission possible frequency r will be described. In FIG. 4, a conceptual diagram showing a time series relationship of the control cycle T, the timeout period t, and the retransmission possible frequency r is shown.

As shown in FIG. 4, the control cycle T is a cycle for transmitting the control information to specific equipment (for example, equipment 101). The timeout period t is shorter than the control cycle T. Further, in the present embodiment, a product of the timeout period t and the retransmission possible frequency r is prescribed to be smaller than the control cycle T.

Specifically, the timeout period t is a period obtained by dividing the control cycle T by a number obtained by adding one to the retransmission possible frequency r. That is, in the present embodiment, the control cycle T, the timeout period t, and the retransmission possible frequency r satisfy the relationship of $t=T/(r+1)$.

The control unit 240 controls various functions of the power control system 1 and includes CPU, storages, and the like. The control unit 240 controls various functions by an application operating in a higher layer. The control unit 240 controls a transmission of the control information.

The control unit 240 controls the transceiver unit 210 to retransmit the control information to the equipment when response information corresponding to the control information is not received within the timeout period t that is set to be shorter than the control cycle T (the predetermined cycle) from the transmission of the control information from the transceiver unit 210 to the equipment. In the present embodiment, the control unit 240 is configured to change the timeout period t by controlling the retransmission possible frequency r within the period of the control cycle T. Specifically, the control unit 240 comprises an equipment control unit 241 and a retransmission processing unit 242.

The equipment control unit 241 controls a process that is to be performed by the equipment 101 to 104. The equipment control unit 241 transmits, to the equipment 101 to 104, the control information for controlling the equipment 101 to 104 through the transceiver unit 210 in the control cycle T. The equipment control unit 241 may transmit the control information to one of the plurality of equipment 101 to 104, and may also transmit the control information to the plurality of equipment 101 to 104.

Here, the control information includes information requesting a state (a status) for monitoring an operation of each of the plurality of equipment 101 to 104, or information for instructing, to the equipment, a process such as On/Off of a power supply, power generation, charging/discharging, and an air condition switch, and the like. Since the control information is different according to functions that the equipment 101 to 104 have, the control information is not limited to hereto and can include various other information.

The retransmission processing unit 242 performs a retransmission control for retransmitting the control information when the response information corresponding to the control information is not received from the equipment 101 to 104 within the timeout period t from a transmission of the control information. Specifically, the retransmission processing unit 242 retransmits the control information through the transceiver unit 210 when the response information corresponding to the control information is not received within the timeout period t from the transmission of the control information.

Further, the retransmission processing unit 242 can perform a timeout period change process for changing the timeout period t. The retransmission processing unit 242 is configured to change the timeout period t by changing the retransmission possible frequency r.

Specifically, the retransmission processing unit 242 extends the timeout period t by reducing the retransmission possible frequency r, when a response period $\Delta t$, which is until the response information corresponding to the control information is received, is longer than the timeout period t in the transceiver unit 210.

Furthermore, the retransmission processing unit 242 shortens the timeout period t by increasing the retransmission possible frequency r, when the response period $\Delta t$ is shorter than the timeout period t and the response period $\Delta t$ is shorter than a period obtained by dividing the control cycle T by a number obtained by increasing the retransmission possible frequency r by two.

Also, the retransmission processing unit 242 can set, as a timeout period t of the predetermined equipment, a timeout period t used in other equipment (for example, 102) whose number h of hops and equipment type are the same as the predetermined equipment (for example, 101), when changing the timeout period t.

(Control Method)

Figure 5:
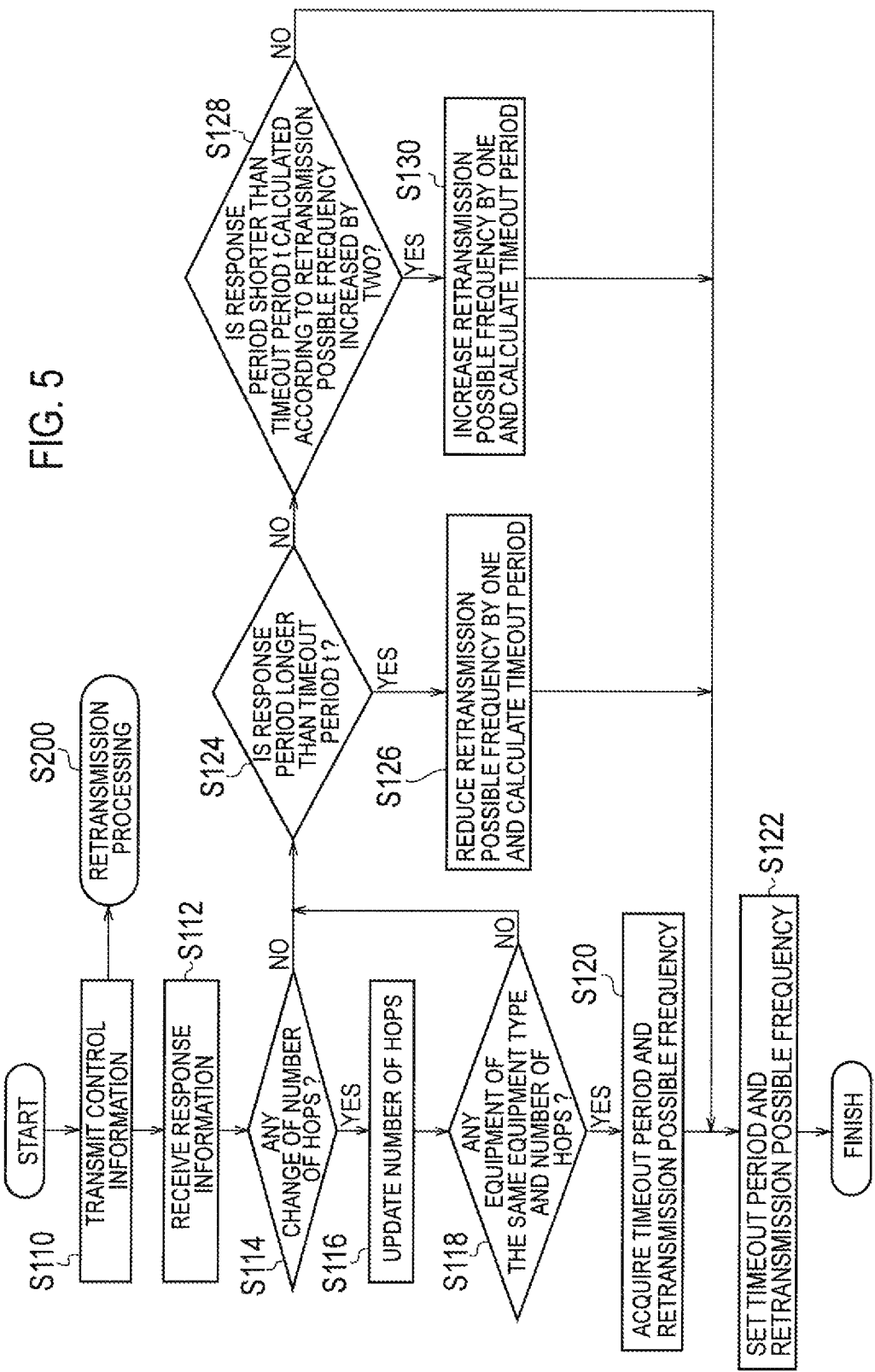
FIG. 5 is a flow chart showing a control method according to the first embodiment.

Hereinafter, a control method according to the first embodiment will be described. FIG. 5 is a flow chart showing the control method according the first embodiment. Specifically, FIG. 5 shows an operation of the HEMS 200 according to the present embodiment when transmitting control information to equipment (for example, 101) in a control cycle T.

In step S110, in the HEMS 200, the equipment control unit 241 transmits control information to the equipment 101 in each control cycle T. After this, the retransmission processing unit 242 starts a process (step S200) according to the retransmission control, and the process will be described later. In steps after step S112, a timeout period change process performed by the HEMS 200 is shown.

In the step S112, in the HEMS 200, the retransmission processing unit 242 receives response information corresponding to the control information from the equipment 101. The retransmission processing unit 242 acquires a number of hops included in the response information.

In step S114, the retransmission processing unit 242 compares a number h "h1" of hops with the number of hops included in the response information, wherein the number h "h1" of hops is associated with the equipment ID "ID 101" of the equipment 101 and stored by the storage unit 220, and determines whether these numbers of hops are different or not. When the result of the determination is YES, the HEMS 200 performs a process of step S116. When the result of the determination is NO, the HEMS 200 performs a process of step S124 described later.

In the step S116, the storage unit 220 updates the number h of hops, which is associated with the equipment ID "ID 101" of the equipment 101 and stored, to the number of hops included in the response information.

In step S118, the retransmission processing unit 242 performs a change of the timeout period t. At this time, the retransmission processing unit 242 refers to the storage unit 220 and determines whether there is equipment of the same number h of hops and equipment type ID (equipment type) as the equipment 101 among other equipment.

Specifically, the retransmission processing unit 242 determines whether there is other equipment ID that the number h "h1" of hops, which is associated with the equipment ID "ID 101" and stored, and the equipment type ID "air conditioner", which is associated with the equipment 101 and stored, match or not. When the result of the determination is YES, the HEMS 200 performs a process of step S120. When the result of the determination is NO, the HEMS 200 performs a process of the step S124 described later.

In the step S120, the retransmission processing unit 242 refers to the storage unit 220 and acquires the timeout period t and the retransmission possible frequency r which are associated with the other equipment ID, that the number h "h1" of hops and the equipment type ID "air conditioner" of the equipment 101 match, and are stored.

In step S122, the storage unit 220 updates the timeout period t and the retransmission possible frequency r associated with the equipment ID "ID101" and are stored to the acquired timeout period t and retransmission possible frequency r. That is, the retransmission processing unit 242 sets a timeout period t and a retransmission possible frequency r, that are set for other equipment (for example, 102) of the same number h of hops and equipment type ID (equipment type) as the equipment 101, as a timeout period t of the equipment 101 and a retransmission possible frequency r. The timeout period t and the retransmission possible frequency r stored in the step S122 are applied to a transmission of control information to the equipment 100 in the next control cycle T.

On the other hand, in the step S118, when it is determined that there is no other equipment has the same number h of hops and equipment type ID (equipment type) as the equipment 101, the retransmission processing unit 242 acquires, in the step S124, a response period $\Delta t$ from a transmission of control information to a reception of response information. Further, the retransmission processing unit 242 refers to the timeout period t associated with the equipment ID "ID 101" of the equipment 101 and stored in the storage unit 220, and determines whether the response period $\Delta t$ is longer than the timeout period t or not. When the result of the determination is YES, the HEMS 200 performs a process of step S126. When the result of the determination is NO, the HEMS 200 performs a process of step S128 described later.

When it is determined that the response period $\Delta t$ is longer than the timeout period t, in the step S126, the retransmission processing unit 242 extends the timeout period t by reducing the retransmission possible frequency r. In the present embodiment, the retransmission processing unit 242 calculates a timeout period t extended than before by reducing retransmission possible frequency by one. Specifically, the retransmission processing unit 242 calculates the extended timeout period t so that the relationship of $t=T/((r-1)+1)$ is satisfied. After this, the storage unit 220 updates the retransmission possible frequency r and the timeout period t, which are associated with the equipment ID "ID 101" of the equipment 101 and stored, to the retransmission possible frequency r reduced by one and the extended timeout period t (step S122).

When it is determined that the response period $\Delta t$ is shorter than the timeout period t, in the step S128, the retransmission processing unit 242 determines whether the response period $\Delta t$ is shorter than a period described below.

Specifically, the retransmission processing unit 242 determines whether the response period $\Delta t$ is shorter than the timeout period t or not and whether the response period $\Delta t$ is shorter than a period $\Delta ta$ obtained by dividing the control cycle T by a number obtained by increasing the retransmission possible frequency r by two. That is, the retransmission processing unit 242 determines whether both of the relationships of $\Delta t<t$ and $\Delta t<\Delta ta=(T/(r+2))$ are satisfied or not. When the result of the determination is YES, the HEMS 200 performs a process of step S130. When the result of the determination is NO, the HEMS 200 performs a process of the step S122.

When it is determined that both of the relationships of $\Delta t<t$ and $\Delta t<\Delta ta=(T/(r+2))$ are satisfied, in the step S130, the retransmission processing unit 242 shortens the timeout period t by increasing the retransmission possible frequency r. In the present embodiment, the retransmission processing unit 242 calculates a timeout period t shortened than before by increasing the retransmission possible frequency r by one. Specifically, the retransmission processing unit 242 calculates the shortened timeout period t so that the relationship of $t=T/((r+1)+1)$ is satisfied. After this, the storage unit 220 updates the timeout period t and the retransmission possible frequency r associated with the equipment ID "ID 101" of the equipment and stored to the retransmission possible frequency r increased by one and the shortened timeout period t (step S122). Here, when it is determined that the relationship of the response period $\Delta t$, the timeout period t, and the retransmission possible frequency r satisfies the relationship of $t>\Delta t>\Delta ta=(T/(r+2))$, the storage unit 220 does not update the timeout period t and the retransmission possible frequency r (step S122). There, it should be noted that the retransmission processing unit 242 applies the stored timeout period t and retransmission possible frequency r to the next control cycle T.

Figure 6:
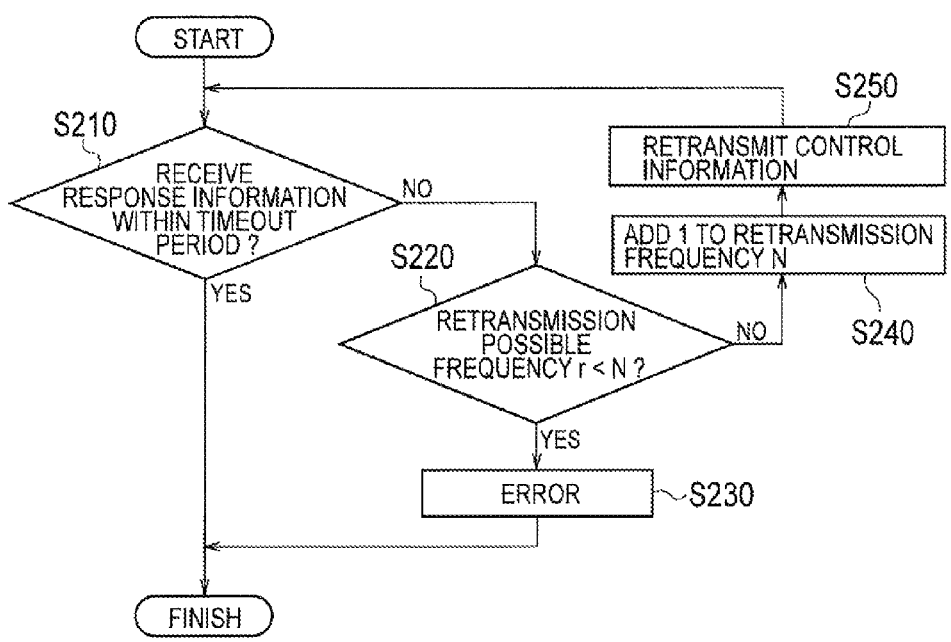
FIG. 6 is a flow chart showing a control method according to the first embodiment.

Subsequently, an operation (step S200) of the retransmission processing unit 242 when performing a retransmission control will be described. FIG. 6 is a flow chart showing the operation of the retransmission processing unit 242 according to the present embodiment when performing the retransmission control.

In a step S210, the retransmission processing unit 242 refers to the timeout period t associated with the equipment ID "ID 101" of the equipment 101 and stored in the storage unit 220. The retransmission processing unit 242 determines whether the response information is received within the timeout period t, which is set to be shorter than the control cycle T, from the transmission of the control information from the transceiver unit 210 to the equipment 101. When the result of the determination is YES, the HEMS 200 finishes the process. When the result of the determination is NO, the HEMS 200 performs a process of step S220.

In the step S220, the retransmission processing unit 242 refers to a retransmission frequency N and the retransmission possible frequency r associated with the equipment ID "ID 101" of the equipment 101 and stored in the storage unit 220. The retransmission processing unit 242 determines whether the retransmission frequency N that the control information is transmitted is larger than the retransmission possible frequency r. When the result of the determination is YES, the HEMS 200 performs a process of step S230. When the result of the determination is NO, the HEMS 200 performs a process of step S240.

In the step S230, the retransmission processing unit 242 determines that a transmission error of the control information corresponding to the equipment 101 occurs and notifies the processing result to the equipment control unit 241.

In the step S240, the storage unit 220 adds 1 to the retransmission frequency N and stores it. Further, in step S250, the retransmission processing unit 242 retransmits the control information through the transceiver unit 210. After this, the retransmission processing unit 242 repeats the processes from the step S210 to 250.

The HEMS 200 according to the present embodiment transmits control information to equipment (for example, 101) in a control cycle T. The HEMS 200 retransmits the control information when the response information is not received from the equipment 101 within the timeout period t from the transmission of the control information to the equipment 101. Further, a product of the timeout period t and the retransmission possible frequency r is set to be smaller than the control cycle T. Also, the HEMS 200 is configured to change the timeout period t by changing the retransmission possible frequency r, when the timeout period t should be changed.

In said HEMS 200, since the product of the timeout period t and the retransmission possible frequency r is a period smaller than the control cycle T, the retransmission control finishes within the control cycle T even when the retransmission control of the control information is repeatedly performed based on the timeout period t. Therefore, a retransmission of the control information, which is to be transmitted after the transmission of the control information in the next control cycle T, can be prevented.

In this way, according to the HEMS 200 according to the present embodiment, when the control information for performing a control of the equipment 101 to 104 is transmitted in the predetermined cycle, a congestion of the control information can be suppressed by setting the timeout period t properly.

Furthermore, the timeout period t is a period obtained by dividing the control cycle T by a number obtained by adding one to the retransmission possible frequency r that the control information can be retransmitted within the control cycle T. That is, since the timeout period t, the control cycle T, and the retransmission possible frequency r satisfy the relationship of $t=T/(r+1)$, the retransmission control can be finished surely within the control cycle T even when the retransmission control of the control information is performed repeatedly based on the timeout period t.

Further, the HEMS 200 extends the timeout period t by reducing the retransmission possible frequency r when the response period $\Delta t$ from the transmission of the control information to the reception of the response information is longer than the timeout period t.

Furthermore, the HEMS 200 shortens the timeout period by increasing the retransmission possible frequency r when the response period $\Delta t$ is shorter than the timeout period t and the response period $\Delta t$ is shorter than the period $\Delta ta$ obtained by dividing the control cycle T by a number obtained by adding two to the retransmission possible frequency r. Therefore, the HEMS 200 can optimize the timeout period t while suppressing the congestion of the control information in accordance with the response period $\Delta t$, in a communication through the radio communication network 100 (an ad hoc network).

When other equipment (for example, 102) of the same number h of hops and equipment type as the equipment (for example, 101) exists while changing the timeout period, the HEMS 200 sets the timeout period t and the retransmission possible frequency r set for the other equipment 102 as the timeout period and the retransmission possible frequency r of the equipment 101. Accordingly, in the HEMS 200, a congestion of the control information can be suppressed more surely by using the timeout period t and the retransmission possible frequency r proven and used in other equipment.

[Other Embodiments]

The present invention has been explained as the embodiment described above, however, it must not be understood that the discussions and the drawings that constitute a part of this disclosure limit the present invention. Various modifications, embodiments, and operation techniques will be apparent to those of ordinary skill in the art in viewing of this disclosure.

For example, in the embodiment described above, in the step S128, the retransmission processing unit 242 has determined whether the response period Δt is shorter than the timeout period t or not and whether the response information Δt is shorter than the period Δta obtained by dividing the control cycle T by the number obtained by increasing the retransmission possible frequency r by two. That is, the retransmission processing unit 242 has determined whether both of the relationships of Δt<t and Δt<Δta=(T/(r+2)) are satisfied or not.

However, the retransmission processing unit 242 may determine whether the response period Δt is shorter than the timeout period t and is shorter than a period Δtb that is obtained by subtracting a predetermined period a from the period Δta. That is, the retransmission processing unit 242 may determine whether both of the relationships of Δt<t and Δt<Δtb=((T/(r+2))−α) are satisfied or not.

Here, the predetermined period α is an offset value. The predetermined period α may be, for example, 10% of the timeout period t and the like, prescribed by a ratio to the timeout period t. In the HEMS 200, since the response period Δt is determined to be shorter than the period Δtb obtained by further subtracting the period Δta, it is determined that no hindrance occurs to a retransmission control even increasing the retransmission possible frequency r and shortening the timeout period t. That is, in the HEMS 200, a condition that the response period Δt changes slightly such as a radio communication is taken into consideration, and an occurrence of a hindrance to the retransmission control can be prevented even shortening the timeout period t by increasing the retransmission possible frequency r.

Further, in the embodiment described above, the control cycle T, the timeout period t, and the retransmission possible frequency r have been prescribed to satisfy the relationship of T=(r+1) t. However, the product of the timeout period t and the retransmission possible frequency r may be configured to be a fixed value X which is smaller than the control cycle T by a predetermined period β. Specifically, the control cycle T, the timeout period t, and the retransmission possible frequency r may be prescribed to satisfy the relationship of X=(T−β)=r×t. The predetermined period β is an offset value. In this way, the product of the timeout period t and the transmission possible frequency r is smaller than the control cycle T, and when there is a predetermined correlation between the timeout period t and the retransmission possible frequency r, various forms are possible.

Furthermore, in the embodiment described above, a house is exemplified as a consumer and the HEMS 200 is exemplified as a power control apparatus. However, the power control apparatus may be, for example, a BEMS (Building Energy Management System) intended for a building, a FEMS (Factory Energy Management System) intended for a factory, or a CEMS (Community Energy Management System) intended for a community.

Also, in the embodiment described above, it has been described that the HEMS 200 is connected to the equipment 101 to 104 through the radio communication network 100, but it is not limited thereto. The HEMS 200 may be connected to the equipment 101 to 104 through a communication network including wired.

In this way, the present invention includes various embodiments which are not described here. Further, the embodiments and modifications described above can be combined. Therefore, the technique scope of the present invention should be merely determined with reference to the matters used to specify the present invention according to the appropriate claims from the above descriptions.

Note that the entire content of the Japanese Patent Application No. 2011-270579 (filed on Dec. 9, 2011) is incorporated herein by reference.

INDUSTRIAL APPLICABILITY

According to the present invention, it is possible to provide a power control apparatus, a power control system, and a control method to suppress congestion of control information by setting a timeout period properly, when the control information for performing an equipment control is transmitted in a predetermined cycle.

The invention claimed is:

1. A power control apparatus connecting to equipment provided in a consumer through a communication network and controlling the equipment, the power control apparatus comprising:
    a transmission unit that transmits control information for controlling the equipment to the equipment in each predetermined cycle; and
    a control unit that controls a transmission of the control information,
    wherein the control unit is configured to make the transmission unit retransmit the control information to the equipment when a response period from a transmission of the control information, which is from the transmission unit to the control unit, to a reception of response information corresponding to the control information is longer than a timeout period which is set to be a shorter period than the predetermined cycle,
    wherein the control unit is configured to change the timeout period by controlling a retransmission possible frequency of the control information, within a period of the predetermined cycle from the transmission of the control information from the transmission unit to the equipment, and
    wherein the timeout period is configured to be a period obtained by dividing the period of the predetermined cycle by a number obtained by adding one to the retransmission possible frequency of the control information.

2. A power control apparatus connecting to equipment provided in a consumer through a communication network and controlling the equipment, the power control apparatus comprising:
    a transmission unit that transmits control information for controlling the equipment to the equipment in each predetermined cycle; and
    a control unit that controls a transmission of the control information,
    wherein the control unit is configured to make the transmission unit retransmit the control information to the equipment when a response period from a transmission of the control information, which is from the transmission unit to the control unit, to a reception of response information corresponding to the control information is longer than a timeout period which is set to be a shorter period than the predetermined cycle,
    wherein the control unit is configured to change the timeout period by controlling a retransmission possible frequency of the control information, within a period of the predetermined cycle from the transmission of the control information from the transmission unit to the equipment, and wherein the control unit is configured to shorten the timeout period by increasing the retransmission possible frequency of the control information, when the response period is shorter than the timeout period and the response period is shorter than a period obtained by dividing the period of the predetermined cycle by a number obtained by increasing the retransmission possible frequency of the control information by two.

3. A power control apparatus connecting to equipment provided in a consumer through a communication network and controlling the equipment, the power control apparatus comprising:

a transmission unit that transmits control information for controlling the equipment to the equipment in each predetermined cycle; and a control unit that controls a transmission of the control information, wherein the control unit is configured to make the transmission unit retransmit the control information to the equipment when a response period from a transmission of the control information, which is from the transmission unit to the control unit, to a reception of response information corresponding to the control information is longer than a timeout period which is set to be a shorter period than the predetermined cycle, wherein the control unit is configured to change the timeout period by controlling a retransmission possible frequency of the control information, within a period of the predetermined cycle from the transmission of the control information from the transmission unit to the equipment, and wherein the communication network is configured to be an ad hoc network; and wherein the control unit is configured to set, as a timeout period of the equipment, a timeout period that is set for other equipment whose number of hops and equipment type are the same as the equipment, when changing the timeout period.

* * * * *